United States Patent [19]
Ando et al.

[11] Patent Number: 5,828,431
[45] Date of Patent: Oct. 27, 1998

[54] REFLECTIVE-TYPE DISPLAY DEVICE HAVING A REFRACTIVE INDEX RATIO BETWEEN LIGHT SCATTERERS AND HOST BETWEEN 1 AND 1.8

[75] Inventors: Masahiko Ando, Hitachi; Tohru Sasaki, Mobara; Masaaki Kitajima, Hitachioota; Osamu Itoh, Hitachi; Yoshihito Maeda, Osaka; Yoshiharu Nagae; Tatsuya Sugita, both of Hitachi, all of Japan

[73] Assignee: Hitachi, Ltd., Tokyo, Japan

[21] Appl. No.: 507,908

[22] Filed: Jul. 27, 1995

[30] Foreign Application Priority Data

Jul. 27, 1994 [JP] Japan ...................................... 6-175109
Jan. 30, 1995 [JP] Japan ...................................... 7-012318

[51] Int. Cl.⁶ .......................... G02F 1/1333; G02B 26/00
[52] U.S. Cl. .............................................. 349/86; 359/296
[58] Field of Search .............................. 359/296; 349/86, 349/92

[56] References Cited

U.S. PATENT DOCUMENTS 5,156,452 10/1992 Drzaic et al. .............................. 349/86
5,206,747 4/1993 Wiley et al. .............................. 349/86

*Primary Examiner*—William L. Sikes
*Assistant Examiner*—Walter Malinowski
*Attorney, Agent, or Firm*—Antonelli, Terry, Stout & Kraus, LLP

[57] ABSTRACT

A reflective-type display device having a light modulating layer, including a host dispersed with light scatterers, which is held between two transparent electrodes; and a light absorbing layer disposed in back of the light modulating layer. The size of each light scatterer or the nearest distance between the adjacent light scatterers is nearly equivalent to the wavelength of incident light at least in two-dimensional directions. The refractive index ratio relative to incident light between the light scatterers and host is changed from 1 to 1.5 or more depending on the magnitude of a voltage applied across the electrodes.

22 Claims, 21 Drawing Sheets

FORWARD SCATTERING

BACKWARD SCATTERING

FIG. 10(a) BRIGHT STATE
FIG. 10(b) DARK STATE
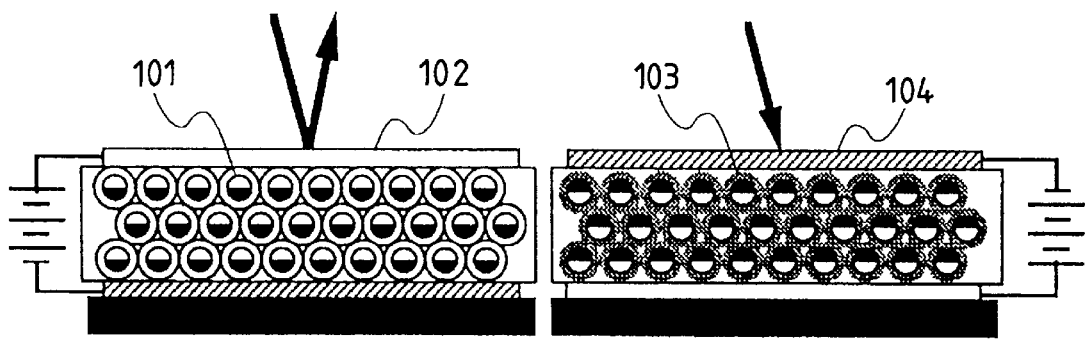
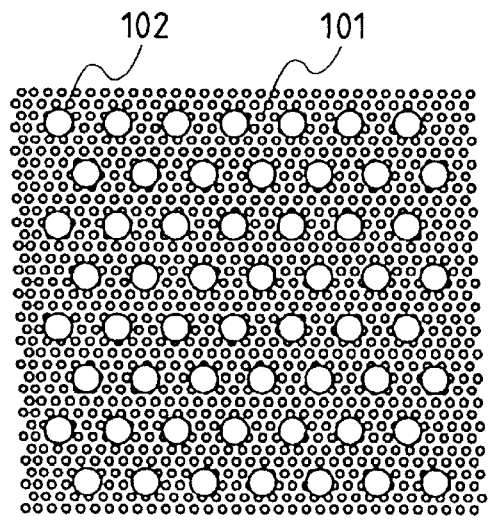
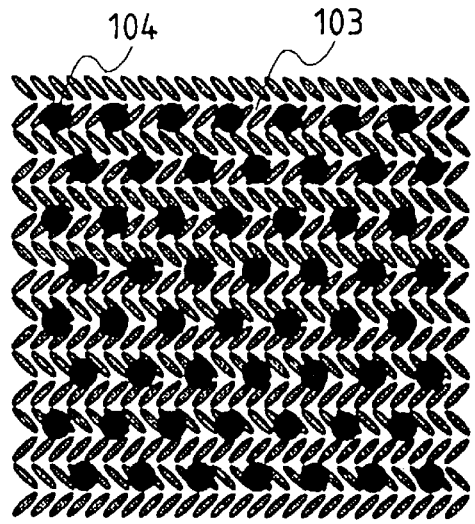

REFLECTIVE-TYPE DISPLAY DEVICE HAVING A REFRACTIVE INDEX RATIO BETWEEN LIGHT SCATTERERS AND HOST BETWEEN 1 AND 1.8

BACKGROUND OF THE INVENTION

The present invention relates to the construction, manufacturing method, manufacturing apparatus and application of a reflective-type liquid crystal display device having a high brightness and high contrast.

There is a known type of reflective-type display device, for example, in which a light modulating layer made of a polymer dispersed liquid crystal and a light absorbing layer are laminated.

FIGS. 7a and 7b are typical sectional views showing general constructions of such reflective-type display devices.

In general, a reflective-type display device includes a light modulating layer 25 (active device) in which the effect on incident light is changed depending on an external field (electric field, magnetic field or the like) applied from a driving circuit 71, and a light modulation supplementary layer 72 (passive device) in which the effect on incident light is usually constant.

The operation of the reflective-type display device can be shifted, by changing an external field applied to the light modulating layer 25, between a bright state, where incident light is scattered/reflected by the display device, and a dark state, where incident light is absorbed by the display device. In an ideal reflective-type display device, the scattering/reflecting ratio of light in the bright state becomes 100% and the absorption coefficient of light in the dark state becomes 100%, and at this time, the maximum brightness and maximum contrast can be obtained.

Two types of light modulating layer have been known, one utilizing optical rotation of a twisted nematic (TN) liquid crystal or the like, and the other utilizing an optical scattering effect of a polymer dispersed liquid crystal (hereinafter, referred to as "PDLC"). In the former type, as shown in FIG. 7a, at least one polarizer is required to be disposed in front of the light modulating layer 25 on the incident light side thereof. The polarizer absorbs a half of the incident light irrespective of the bright/dark states, and accordingly the reflectance becomes 50% or less, making it impossible to realize a reflective-type display device having a high efficiency.

In the latter type, as shown in FIG. 7a, the bright state is realized by the light scattering effect of the light modulating layer, and the dark state is realized by the absorption of incident light by means of the light modulating layer or a light absorbing layer disposed in back of the light modulating layer. In this type, however, since the PDLC exhibits a small light scattering effect, only a thin bright state can be obtained.

FIG. 11 shows a general construction of a light modulating layer utilizing the light scattering effect. Now, the light scattering mechanism of the light modulating layer will be described with reference to FIG. 11.

In general, the light modulating layer has a structure in which fine light scatterers 31, each having a diameter 111 nearly equivalent to the wavelength of incident light, are uniformly dispersed in a host 41. Incident light 61 is changed (refracted) in the advancing direction when it passes through the interface between each light scatterer 31 and the host 41, which are different in refractive index. The light is repeatedly refracted a large number of times, and is thus scattered. Parameters controlling the light scattering are mainly classified into an optical parameter and a parameter relating to the structure of the light modulating layer. The former includes refractive indexes $n_{sc}$ and $n_{bg}$ and absorption coefficients $a_{sc}$ and $a_{bg}$ of the light scatterer and host, respectively, and the latter includes the diameter 111 ($d_{sc}$) of the light scatterer, the dispersion $\Delta d_{sc}$ in the diameters of the light scatterers, the interval 112 ($d_{nn}$) between the adjacent light scatterers, and the dispersion $\Delta d_{nn}$ in the intervals between adjacent light scatterers.

First, a method of realizing a dark state will be described. The most simple method includes the step of making the refractive index of the light scatterer equal to that of the host. In this case, the light modulating layer becomes optically transparent, so that light passes through the light modulating layer without scattering. Accordingly, the dark state can be realized by disposing a light absorbing layer in back of the light modulating layer for absorbing incident light. Another method includes the step of allowing the light modulating layer to absorb incident light by itself, thereby realizing the dark state.

The light modulating layer is required to produce the dark state when it is subjected to an external field (voltage or the like), and to produce the bright state when it is subjected to a different external field. To obtain a deep bright state, incident light must be strongly scattered/reflected from the incident light side by the light modulating layer. This is generally called back scattering. The light modulating layer must satisfy the following three requirements for generating a strong back scattering.

(Requirement 1)

The refractive index ratio between a light scatterer and a host: $n_{sc}/n_{bg}$ should be made larger, preferably, up to 1.5 or more ($n_{sc}/n_{bg} \geq 1.5$ or more).

(Requirement 2)

Each of a diameter $d_{sc}$ of a light scatterer and an interval $d_{nn}$ between adjacent light scatterers should be specified at about the wavelength of the incident light. Each of a dispersion $\Delta d_{sc}$ in diameters of the light scatterers and a dispersion $\Delta d_{nn}$ in intervals between adjacent light scatterers should be specified to be sufficiently smaller than the wavelength of the incident light.

(Requirement 3)

Each of the light absorption coefficients of the light scatterer and host should be sufficiently small.

In particular, in the case where the above requirements are all satisfied, incident light cannot enter the light modulating layer and is all reflected. This is a new optical phenomenon which has been found in recent years, being called "an optical bandgap effect", and has been considered in terms of the application to optical functional devices.

These are called "three requirements of a bright state". A light modulating layer with a high reflectance can be obtained by satisfying the three requirements.

In the PDLC including light scatterers made of a liquid crystal and a host made of a polymer, the refractive index of the liquid crystal is changed by an applied voltage, and it becomes equal to that of the polymer forming the host, to thus realize a high dark state. However, in the PDLC, the backward scattering in a bright state is small and thereby namely, 1) the refractive indexes of liquid crystal forming the light modulating layer and an organic material, such as a polymer forming the host, are usually in the range of from 1.5 to 1.8, and thereby the refractive index ratio between both the materials is small, 1.2 at maximum, thus failing to satisfy the above requirement 1; and 2) the light modulating layer is formed by mixing a liquid crystal and a polymer in a liquid state and then solidifying them, so that the sizes of liquid crystal droplets serving as light scatterers, the distribution thereof, and the distances between liquid crystal droplets cannot be sufficiently controlled, thus failing to satisfy the requirement 2. For this reason, in the PDLC, even in a bright state, most of the incident light rays are slightly scattered by the light modulating layer and transmit the light modulating layer (forward scattering), and are then absorbed by the light absorbing layer, as a result of which the bright state is generally weak.

SUMMARY OF THE INVENTION

An object of the present invention is to provide a construction and a method of manufacturing a light modulating layer which are capable of realizing a deep bright state by satisfying the above-described three requirements for the bright state while satisfying the requirements for realizing a sufficiently dark state, and to provide an ideal reflective-type display device using the light modulating layer.

According to the reflective-type display device of the present invention, there is provided a light modulating layer as shown in FIG. 5a. The light modulating layer includes light scatterers made of inorganic dielectric fine particles, each of which has a refractive index which is linearly changed from $n_{bg}$ to $n_{sc}$ in the direction passing through the axial center thereof, as shown in FIG. 3, and also has a diameter nearly equivalent to the wavelength of the incident light. The light scatterers are spaced at equal intervals, each being nearly equivalent to the wavelength of incident light, in a host having a refractive index of $n_{bg}$. The light scatterers are rotated by an applied voltage.

The above-described light scatterers are formed using an ion shower process, as shown in FIGS. 8a and 8b. Moreover, the light scatterers can be spaced at equal intervals using a light modulating layer manufacturing apparatus including an optical trapping device for dielectric fine particles using a laser, a UV (ultra violet ray) hardening type host covering device and a UV irradiating device.

According to a preferred example of the light modulating layer of the present invention, light scatterers (partially serving as a host) are formed of the above-described dielectric fine particles, each covered with a material having a refractive index equal to the minimum value $n_{bg}$ of the retractive index of the fine particle to a thickness nearly equivalent to a half of the wavelength of the incident light, and they are regularly arranged in a lubricating host having a refractive index equal to the above minimum value $n_{bg}$ (see FIG. 4b).

According to another preferred example of the light modulating layer of the present invention, a material having a refractive index which is changed by an applied voltage, such as liquid crystal, is used as a covering material or a host. In this case, when a surface having a high refractive index in each light scatterer is directed on the incident light side, the refractive index of the host is minimized; and as shown in FIG. 17, when a surface having a low refractive index in each light scatterer is directed on the incident light side, the refractive index of the host is maximized and the maximum value of the refractive index of the host becomes equal to the minimum value of the refractive index of the light scatterer.

The light scatterers and the host microcapsuled as shown in FIG. 4c may be regularly arranged (see FIG. 5c).

The refractive index ratio between the light scatterer and the host is preferably in the range of 1.5 or more.

According to a further preferred mode of the light modulating layer of the present invention, the light modulating layer has not only a light scattering effect, but also a light absorbing effect. Specifically, in the light modulating layer of the present invention, not only the refractive indexes, but also the absorption coefficients of the light scatterer and the host, are changed by an applied voltage, and in the bright state in which the refractive index ratio between the light scatterer and host is maximized, the absorption coefficients thereof are minimized; while, in the dark state in which the refractive index ratio between the light scatterer and host is minimized, the absorption coefficients thereof are maximized.

An optical fiber plate for adjusting the direction of incident light, such that light perpendicularly enters the surface of the light modulating layer, can be disposed in front of the light modulating layer, that is, on the incident light side.

As described above, according to the present invention, a light scatterer has a portion having a high dielectric constant and a portion having a low dielectric constant in the state wherein they are opposed to each other, and thereby, it has an electric polarization. By the polarization and a moment formed by a voltage applied across a pair of electrodes holding a light modulating layer, the light scatterer is rotated such that the polarization is directed in the voltage applying direction. Accordingly, when the polarity of an applied voltage is generated as shown in FIG. 6b, a surface having a high refractive index in a light scatterer is directed on the incident light side. At this time, incident light is strongly scattered by the effect of a high refractive index ratio between the light scatterers and host, and is scattered backward on the incident light side. In accordance with the present invention, since the light modulating layer is so constructed as to satisfy the requirements 1, 2 and 3, the backward scattering effect is particularly high, thus obtaining a deep bright state.

When the polarity of an applied voltage which is reversed compared to that in the above bright state is generated, as shown in FIG. 6a, a surface having a low refractive index (equal to that of the host) in the light scatterer is directed on the incident light side. At this time, the refractive index of the light scatterer is equal to that of the host, incident light is only slightly scattered, and it mostly passes through the light modulating layer and is absorbed by a light absorbing layer disposed in back of the light modulating layer, thus realizing a high dark state.

Since the refractive index ratio between the light scatterer and host is increased as incident light enters the light scatterer in parallel to the center axis thereof, the light scattering/transmitting effect of the light modulating layer can be increased by proper disposition of an optical fiber plate.

BRIEF DESCRIPTION OF THE DRAWINGS

These an other objects, features and advantages of the present invention will be understood more clearly from the following detailed description with reference to the accompanying drawings, wherein:

FIGS. 10a and 10b are views showing the cross-sectional structures of the reflective-type display devices and the internal states of light modulating layers seen from the incident light side with respect to the bright state and dark state;

DESCRIPTION OF THE PREFERRED EMBODIMENTS

Figure 1A:
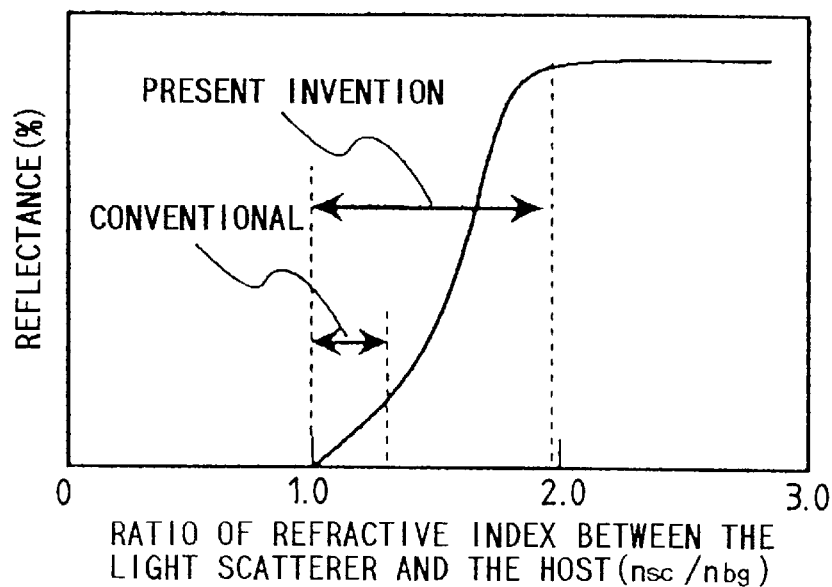
FIG. 1a is a graph showing the dependence of the refractive index ratio between light scatterers and a host on a reflectance and a variable range of the refractive index ratio between the light scatterer and host, with respect to an inventive and prior art reflective-type display devices.
Figure 1B:
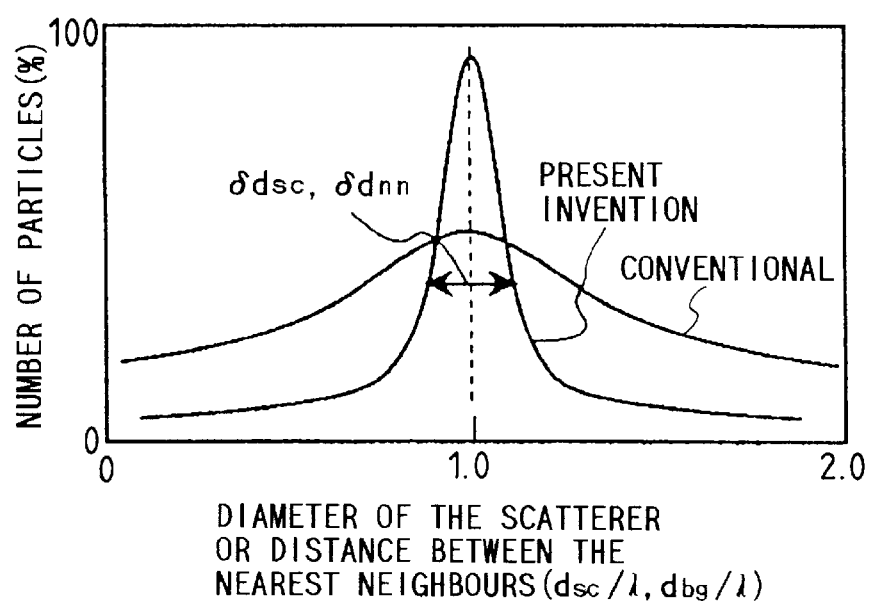
FIG. 1b is a graph showing a relationship between a number of particles, and a diameter of the light scatterer and the distance between nearest neighbors.
Figure 2A:
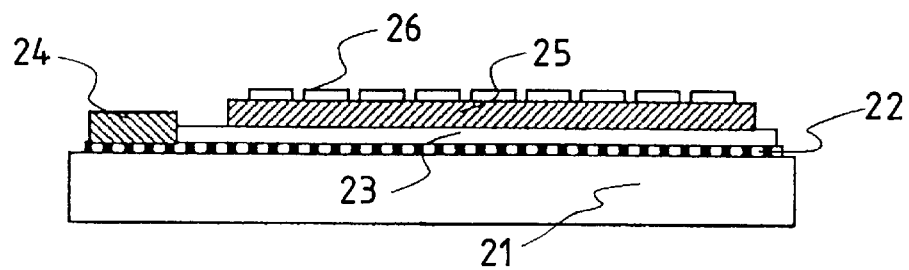
FIGS. 2a and 2b are a view showing the cross-section of the reflective-type display device of the present invention and an exploded view showing the laminated structure thereof, respectively.
Figure 2B:
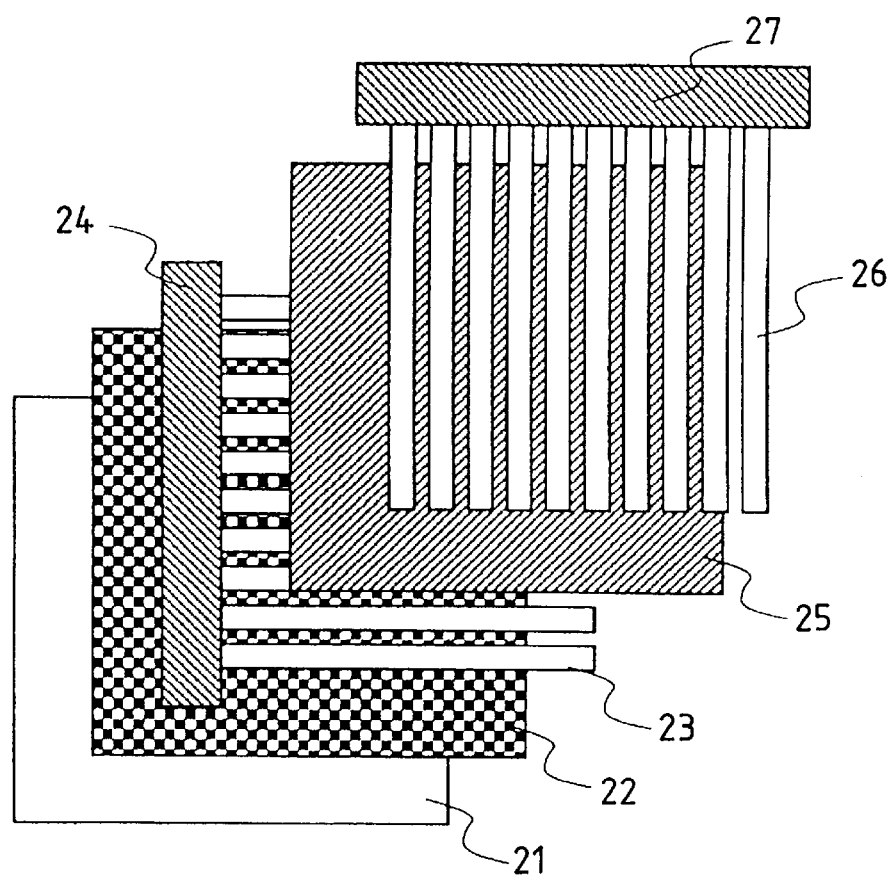
Figure 3:
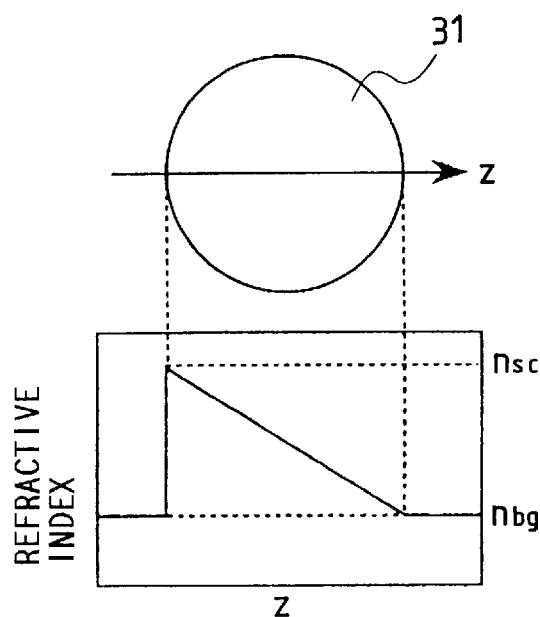
FIG. 3 is a diagrammatic view showing a refractive index distribution in a light scatterer.
Figure 4A:
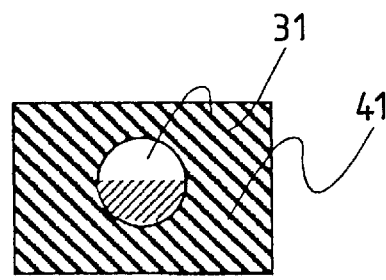
FIGS. 4a, 4b and 4c are diagrammatic views each showing an example of a light scatterer and a host.
Figure 4B:
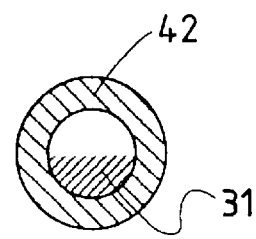
Figure 4C:
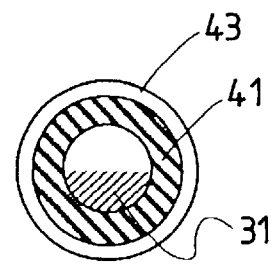
Figure 5A:
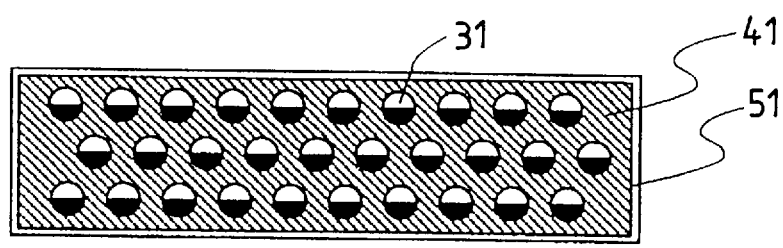
FIGS. 5a, 5b and 5c are views each showing the cross-section of a respective embodiment of the light modulating layer of the present invention.

Hereinafter, the preferred embodiments of the present invention will be described with reference to the drawings. FIG. 2(a) is a sectional view and FIG. 2(b) is an exploded view illustrating the construction of a first embodiment of a reflective-type display device of the present invention. Reference numeral 21 indicates a substrate; 22 denotes a light absorbing layer made of carbon; 23 denotes a bottom transparent electrode made of ITO; 24 denotes a scanning driver; 25 denotes a light modulating layer; 26 denotes an upper transparent electrode made of ITO; and 27 denotes a signal circuit. FIG. 5a is a sectional view of the light modulating layer. A light scatterer 31 is a fine particle of $Ti_xSi_{1-x}O_2$ ($0 \leq x \leq 1$) having a diameter of from about 400 nm to about 700 nm (nearly equal to the wavelength range of incident light in a visible region). As shown in FIG. 8b, in the light scatterer 31, since the ratio x between the content of Ti and the content of Si linearly varies from 0 to 1 in the axial direction, the surface portion where x=1 is made of $TiO_2$ and thereby it has a refractive index which is as high as 2.7; while the opposed surface of x=0 is made of $SiO_2$ and thereby it has a refractive index being as low as 1.5. A host 41 is made of an organic polymer having a refractive index of about 1.5, or is made of $SiO_2$. The light scatterers 31 are regularly spaced at intervals, each being in the range of from about 400 nm to about 700 nm (equal to the wavelength range of incident light in a visible region), in the host 41 through a lubricant 52 having a refractive index of about 1.5.

Figure 18A:
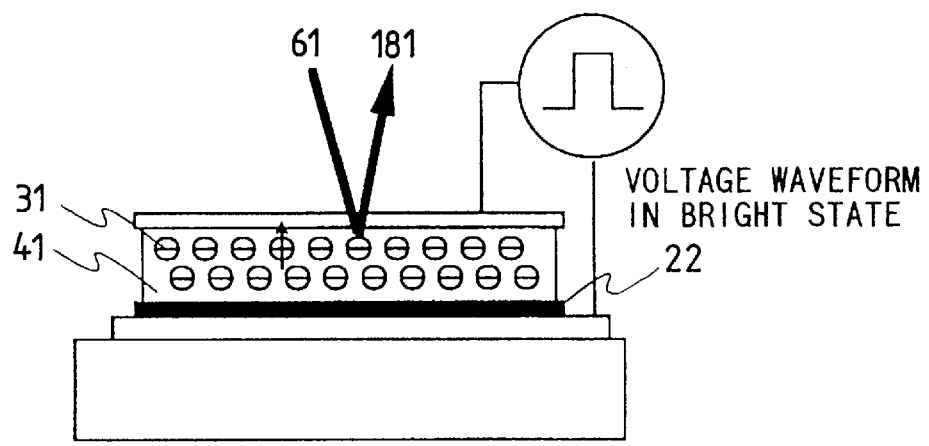
FIGS. 18a and 18b are views showing the relationship between the polarity of an applied voltage, the direction of a light scatterer, and the effect of the reflective-type display device on incident light.
Figure 18B:
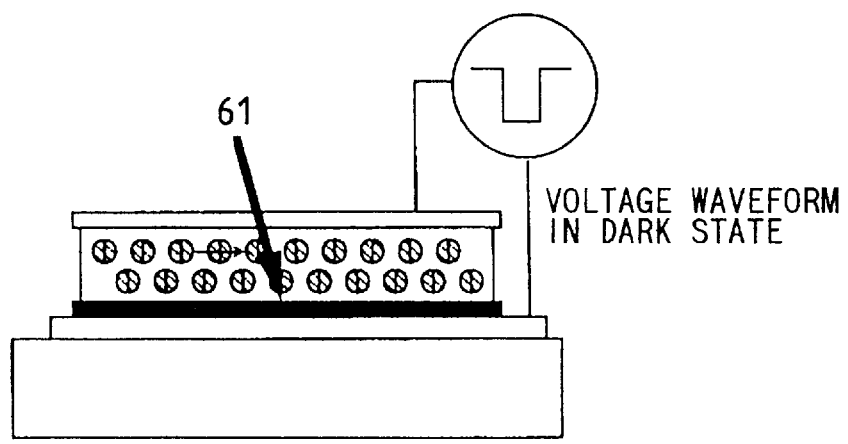

FIGS. 18a and 18b are views showing the relationship between a polarity of an applied voltage, the direction of orientation of the light scatterers and the action of a reflective-type display device on incident light 61. When the bottom electrode is grounded and a negative voltage is applied to the upper electrode (see FIG. 18a), the $TiO_2$ surfaces of the light scatterers are directed toward the incident light side and thereby incident light is strongly scattered backward by the light modulating layer, so as to form a reflective light 181, thus producing a bright state. When a positive voltage is applied to the upper electrode, the $SiO_2$ surfaces of the light scatterers are exposed to the incident light side, and thereby incident light passes through the light modulating layer and is absorbed in the light absorbing layer 22, thus obtaining a dark state.

Figure 9:
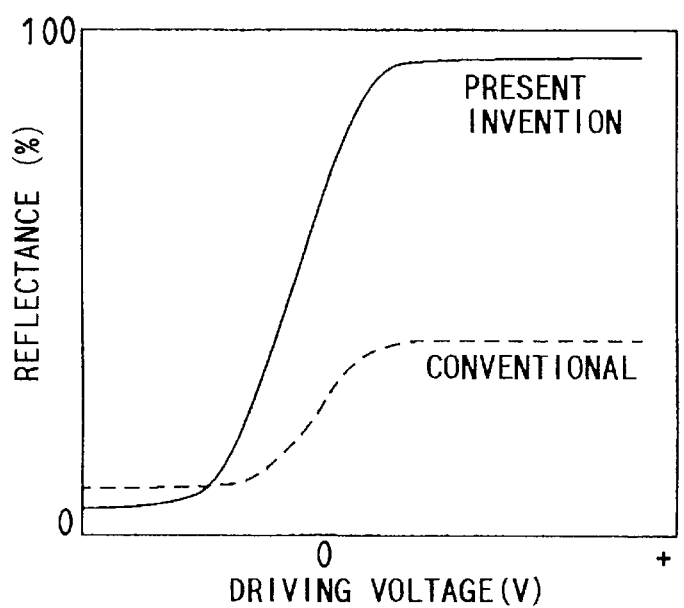
FIG. 9 is a graph showing the voltage dependence on reflectance in the reflective-type display device.
Figure 11:
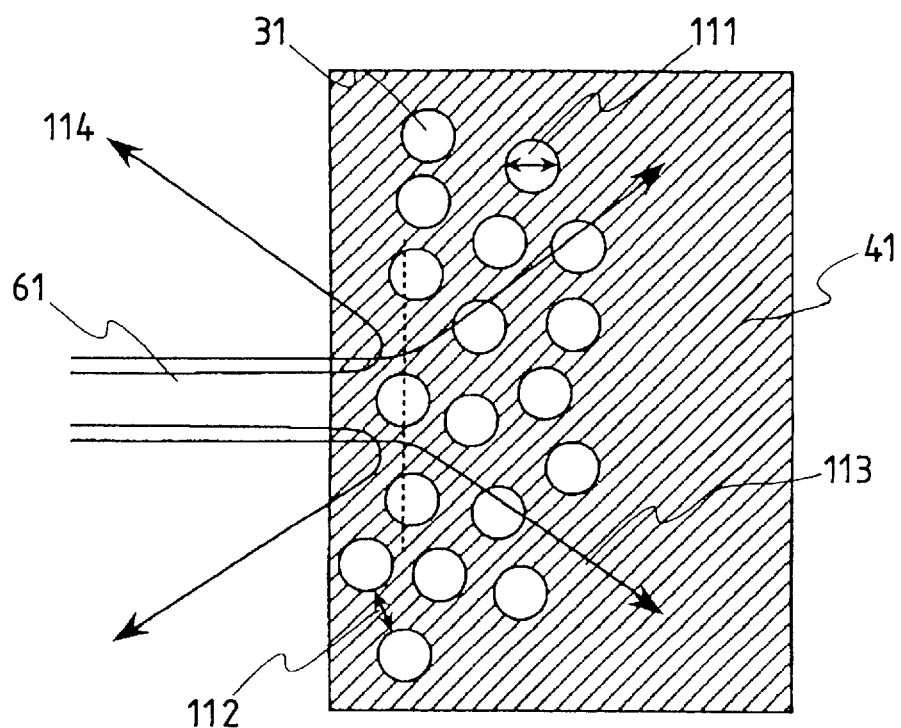
FIG. 11 is a diagrammatic view showing the internal structure of a light modulating layer and a parameter controlling the light scattering characteristics of the light modulating layer.

FIG. 9 shows the voltage dependence on a reflectance in each of the inventive and prior art reflective-type display devices. In the dark state, the reflectances of both the inventive and prior art display devices are low; while in the bright state, the reflectance of the inventive display device is higher (90% or more of incident light is reflected) than that of the prior art display device. Consequently, the present invention is apparently effective in providing a reflective-type display device with a high brightness and high efficiency.

The reflective-type display device of the present invention has a memory effect in which the direction of the light scatterers determined once can be held even when the applied voltage becomes zero. Accordingly, an image constituted of a reflectance distribution of pixels at crossing points of the electrodes, which is obtained, for example, using the above-described upper/bottom transparent electrodes and scanning/signal circuits, can be held even when the applied voltage is removed from the electrodes, thus reducing the power consumption.

Figure 5B:
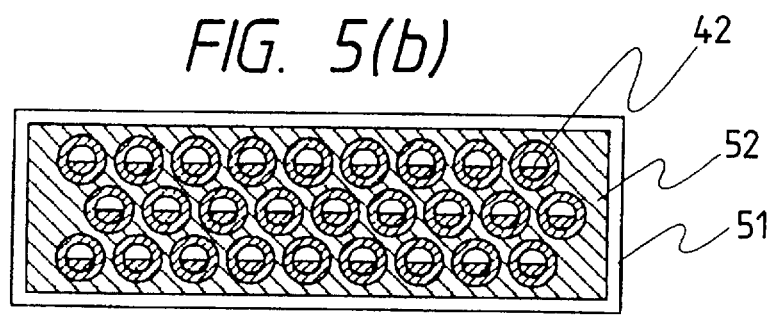

FIG. 5b is a view showing a second embodiment of the light modulating layer of the reflective-type display device of the present invention. The light modulating layer includes covered light scatterers 42 each being formed of the light scatterer in the first embodiment which is covered with a $SiO_2$ film having a thickness of from about 200 nm to about 350 nm, and these light scatterers are regularly and densely arranged in a binder 51 through a lubricant having a refractive index which is nearly the same as that of $SiO_2$. The operating principle of this reflective-type display device is the same as that in the first embodiment, with the same display characteristics as those in the first embodiment. This embodiment is characterized in that the fine particles of the light scatterers can be densely charged in such a manner as to be regularly spaced at intervals each being in the range of from about 400 nm to about 700 nm (nearly equal to the wavelength range of incident light in a visible region) through the lubricant, thereby eliminating the necessity for provision of a means and apparatus for regularly spacing the light scatterers at nearly equal intervals, as required in the first embodiment (in a manner to be described later).

Figure 17:
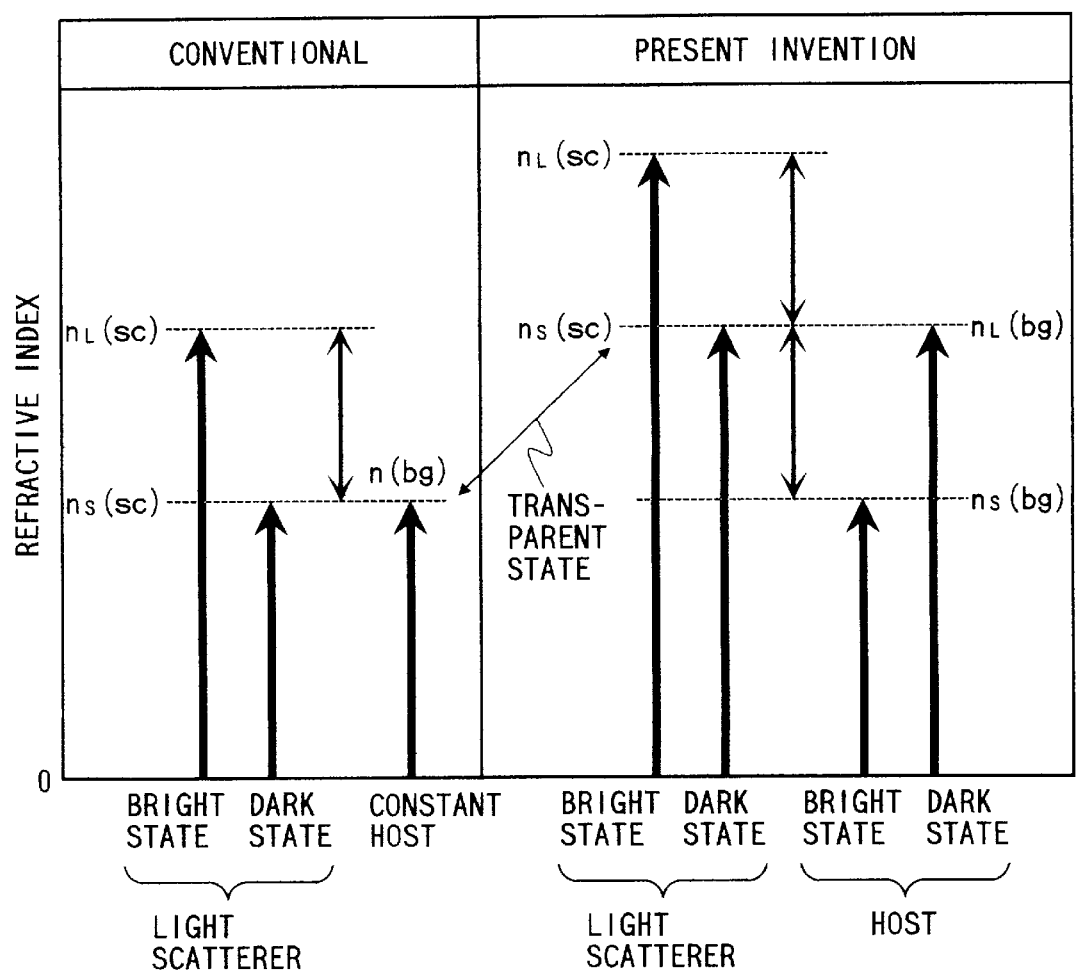
FIG. 17 is a diagram showing the magnitudes of refractive indexes of a light scatterer and a host in the bright state and dark state in the inventive and prior art reflective-type display devices.

FIG. 5a is a view showing a third embodiment of the light modulating layer of the reflective-type display device of the present invention. The light modulating layer is so constructed that the light scatterers in the first embodiment are arranged in a host made of liquid crystal in the condition shown in the first embodiment. The liquid crystal used has a refractive index which becomes 1.3 in a random orientation state with no applied voltage and becomes 1.5 in an orientation state with an applied voltage (liquid crystal having a negative dielectric anisotropic). In the state wherein a positive voltage is applied to an upper electrode and then becomes zero, a bright state is obtained; while in the state wherein a negative voltage is applied and held, a dark state is obtained. In the bright state, due to the effect of a large refractive index ratio between liquid crystal and the $TiO_2$ surfaces of the light scatterers, incident light is scattered backward from the light modulating layer. In the dark state, since the refractive index of the liquid crystal corresponds to that of the $SiO_2$ surfaces of the light scatterers, incident light passes through the light modulating layer and is absorbed in a light absorbing layer. As shown in FIG. 17, in this embodiment, since the refractive index of the host is also changed depending on the applied voltage, and particularly, the refractive index of the host becomes smaller than the minimum value of the light scatterers in the bright state, the refractive index ratio therebetween can be made larger than that in the case where the refractive index of the host is constant. Accordingly, in this embodiment, a deeper bright state can be realized. The same effect can be obtained for the case of using a host material, such as a dispersed particle system (DPS) material, such as acicular metal powder (for example, chromium powder), hematite acicular crystal, and quinine or hydrocinchonidine having iodine crystal.

Figure 5C:
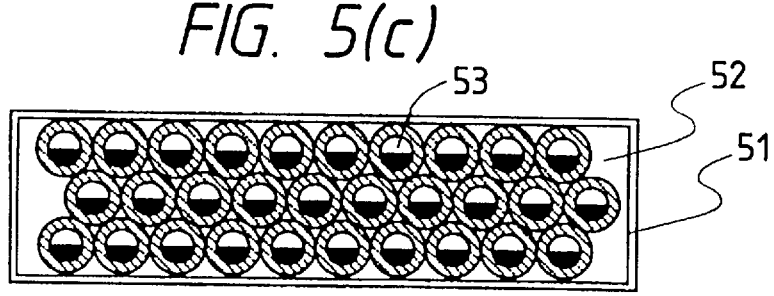
Figure 6A:
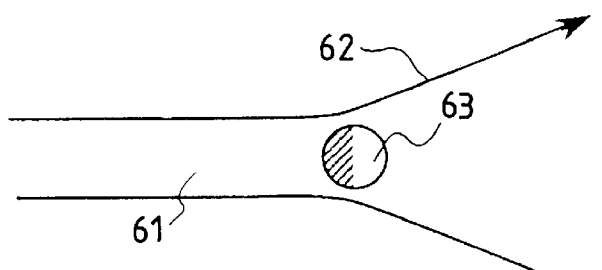
FIGS. 6a and 6b are diagrammatic views showing the relationship between the direction of a light scatterer and scattered light.
Figure 6B:
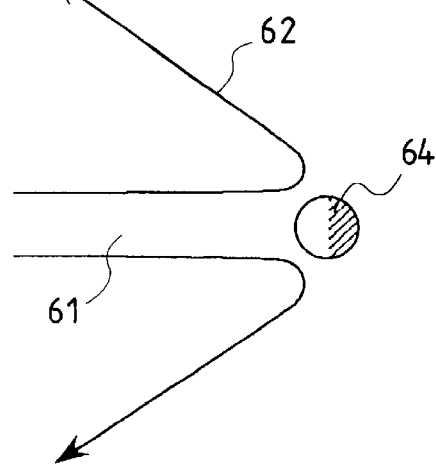
Figure 7A:
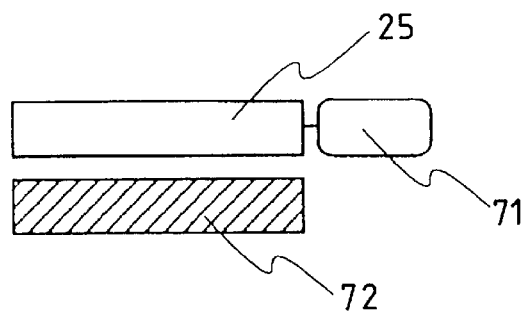
FIGS. 7a and 7b are views showing constructions of the inventive and prior art reflective-type display devices.
Figure 7B:
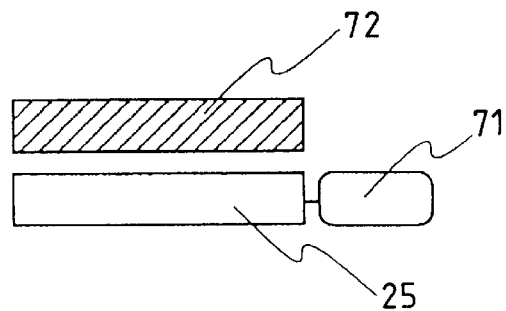

FIG. 5c is a view showing a fourth embodiment of the light modulating layer of the reflective-type display device of the present invention. The light modulating layer is so constructed that microcapsules 53 enclosing light scatterers covered with a host are regularly and densely arranged in a binder 51. This embodiment is characterized in that the light scatterers can be regularly spaced at intervals, each being in the range of from about 400 to about 700 nm (nearly equal to the wavelength range of incident light in a visible region), through a lubricant by densely charging the microcapsules, each having a diameter of from about 800 to about 1500 nm (in this case, the thickness of the liquid crystal host becomes about 200 to 350 nm), thereby eliminating the necessity for provision of a means and apparatus for regularly spacing the light scatterers at nearly equal intervals, which are required for the first and third embodiments.

FIGS. 10a to 10d are views showing a fifth embodiment of the light modulating layer of the reflective-type display device of the present invention. In this light modulating layer, a host is made of a guest-host liquid crystal containing a light absorbing pigment; and the $SiO_2$ surface of the light scatterer in the first embodiment is covered with a material having a refractive index nearly equal to that of $SiO_2$ and having an absorption coefficient higher than that of $SiO_2$, such as $PrMnO_3$, $As_2S_3$, $As_2Se_3$, Ge, a-$Si_xC_{1-x}$:H, $Sb_2S_3$, CdTe, CdSe or PbCdTe:In. In addition to the feature of the third embodiment, this embodiment has a new feature in which the light modulating layer absorbs incident light by itself, thus realizing a deep dark state.

Figure 16A:
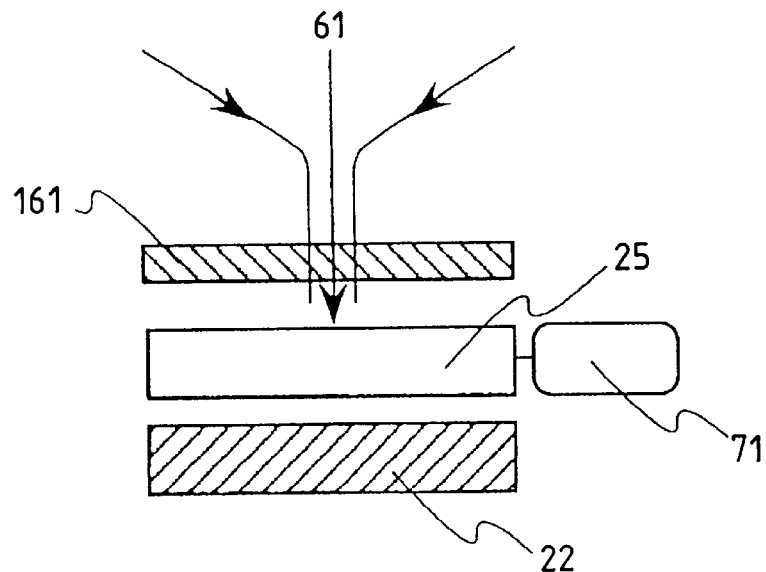
FIGS. 16a, 16b are diagrams showing the construction of a reflective-type display device using an optical fiber plate and a graph of driving voltage versus reflectance, respectively.
Figure 16B:
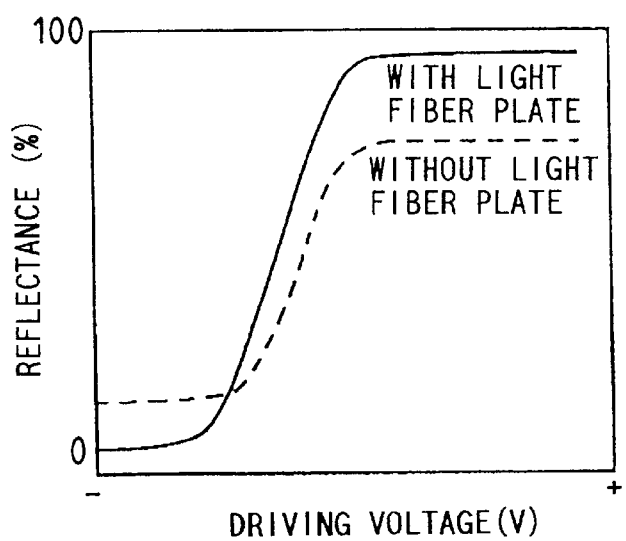

FIG. 16a is a view showing a sixth embodiment of a light modulating layer of the reflective-type display device of the present invention and FIG. 16b is a graph showing a voltage dependence on the reflectance in the light modulating layer. An optical fiber plate 161 is disposed in front of the light modulating layer, that is, on the incident light side. The optical fiber plate has a function of arranging the direct incident light 61 such that the incident light 61 perpendicularly enters the surface of the light modulating layer. As incident light enters the light scatterer in parallel to the center axis thereof, the refractive index ratio between the light scatterers and host is made larger, and consequently the light scattering/transmitting effect can be further increased by use of the optical fiber plate. FIG. 16(b) shows the voltage dependence on the reflectance of the reflective-type display device for each of the first to sixth embodiments, and for each of the cases where the optical fiber plate is provided and not provided. In the case where the optical fiber plate is provided, the reflectance in the dark state becomes low and the reflectance in the bright state becomes high, thus enhancing the effect of the present invention.

Figure 8A:
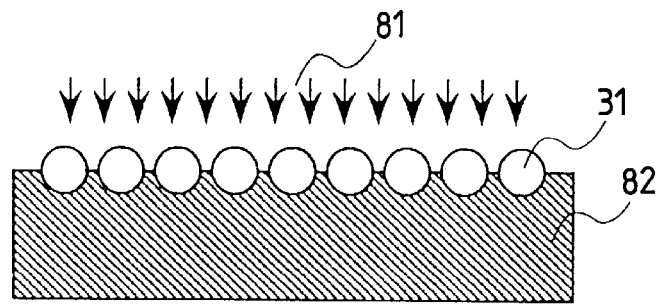
FIGS. 8a and 8b are diagrammatic views showing a method of manufacturing light scatterers, and a relationship between the component distribution of the light scatterers and refractive index distribution, respectively.
Figure 8B:
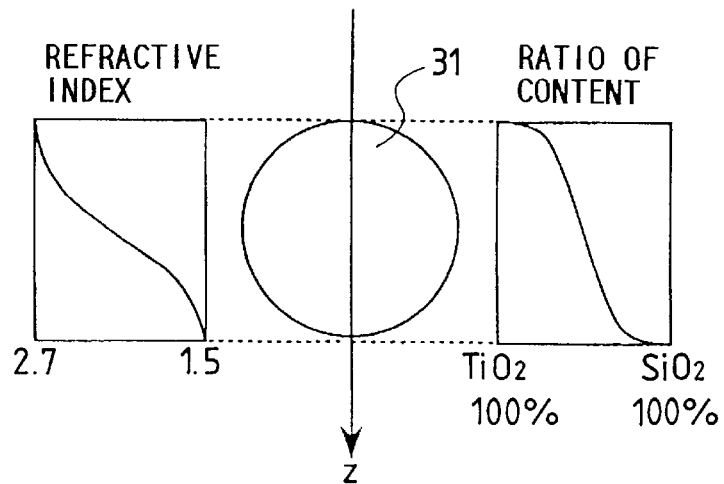

FIGS. 8a and 8b show a method of manufacturing light scatterers having a refractive index distribution used for the reflective-type display device of the present invention. In this method, $SiO_2$ fine particles 31, each having a diameter of from 400 to 700 nm, are floated on a solution 82 having a specific gravity which is adjusted such that at least half of the surfaces of the $SiO_2$ fine particles are exposed above the surface of the solution 82. In such a state, an ion shower 81 of Ti is formed using a general ion doping apparatus (for example, used for formation of an active layer of a semiconductor), and ions of Ti are injected toward the upper side to the $SiO_2$ fine particles. The injected area of Ti ions is highest at the uppermost portion of each fine particle and is lower on the side portions, and accordingly, by suitably adjusting the injecting time and injecting density, there can be obtained a light scatterer in which the uppermost portion is made of $TiO_2$, the content ratio of Si to Ti being linearly increased toward the lowermost portion, and the lowermost portion is made of $SiO_2$ The refractive index of the light scatterer is linearly changed from 2.7 for $TiO_2$ to 1.5 for $SiO_2$, thus satisfying the requirement for the light scatterer used for the reflective-type display device of the present invention.

Figure 12:
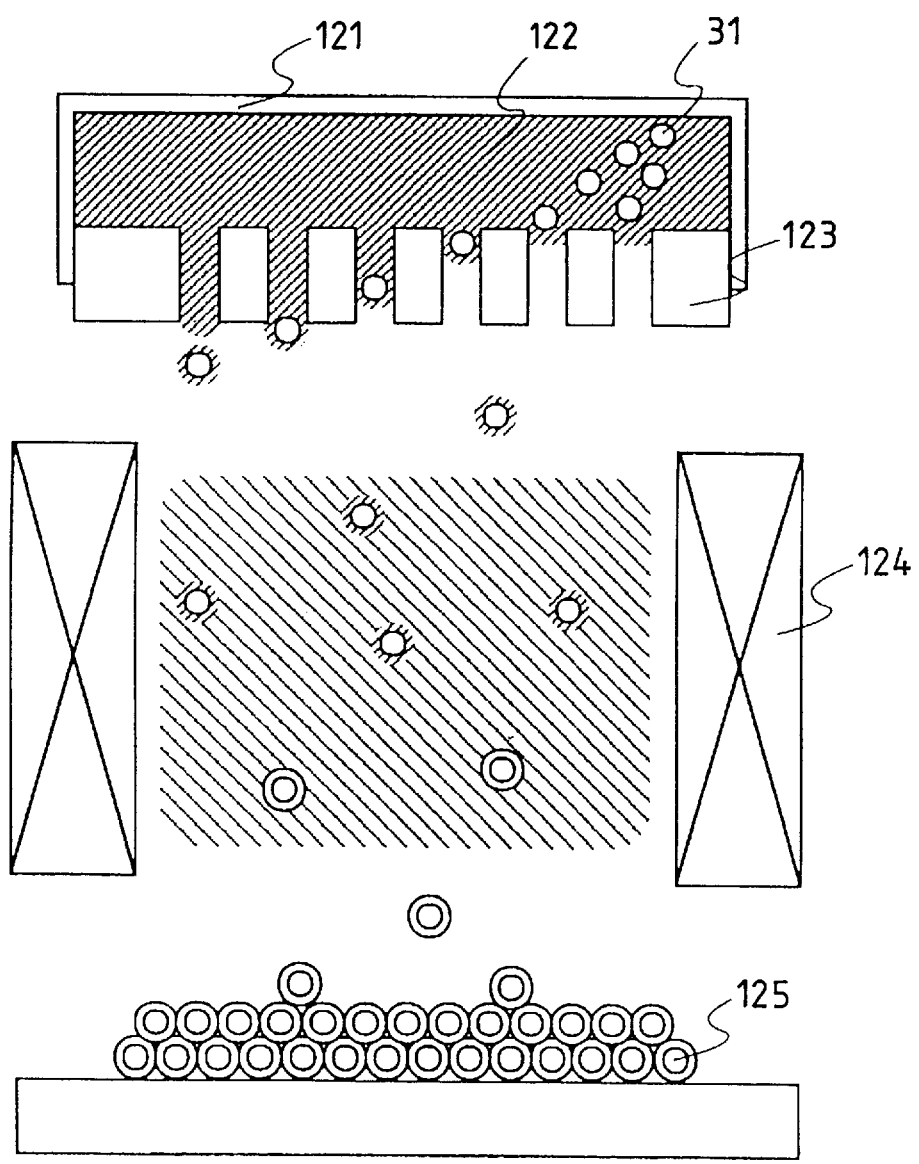
FIG. 12 is a diagrammatic view showing an apparatus for manufacturing light scatterer spheres covered with a covering material.

FIG. 12 is a schematic view of a manufacturing apparatus for forming light scatterers which are uniformly covered with $SiO_2$ as described in the second embodiment. Light scatterers 31 and $SiO_2$ liquid 122 (for example, one used for covering the surface of a glass substrate for liquid crystal display with $SiO_2$ ) are mixed in a mixing chamber 121, and then the mixture is allowed to pass through a porous glass 123 having pores with a diameter of from 800 to 1500 nm in order to adjust the covering thickness of the $SiO_2$ liquid in the range of from 200 to 350 nm. The light scatterers thus covered with the $SiO_2$ liquid are heated at 1000° C. or more in a heating chamber 124, to dry and solidify the $SiO_2$ liquid, thereby forming covered light scatterers 125 uniformly covered with $SiO_2$ in accordance with the second embodiment. In particular, by heating the light scatterers in the heating chamber while freely dropping them, there can be formed covered light scatterers as described in the second embodiment, each being covered with $SiO_2$ with a uniform covering thickness and having a shape near an ideal sphere with the light scatterer positioned at the center.

Figure 13:
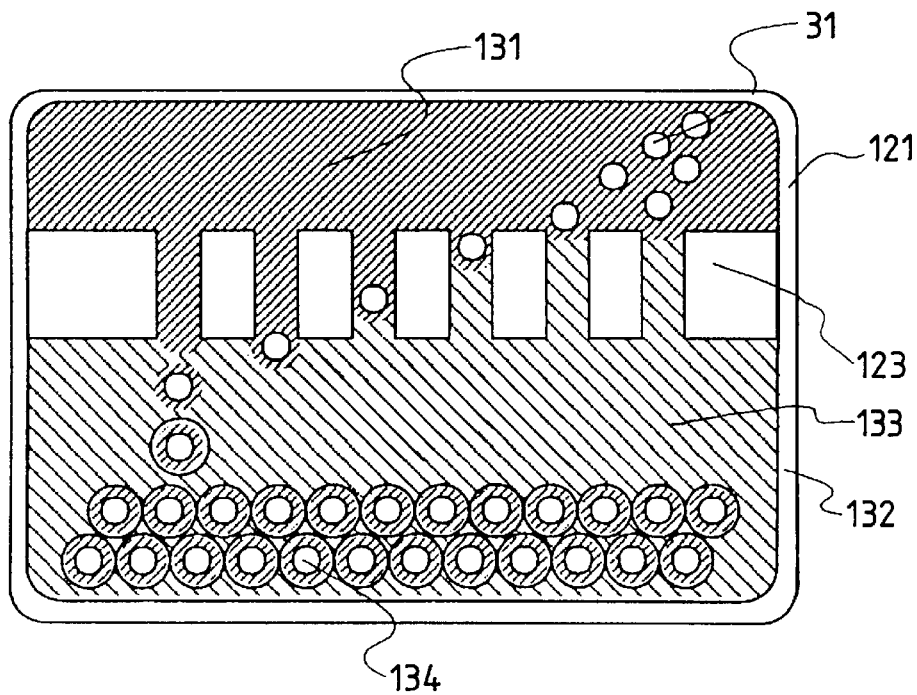
FIG. 13 is a diagrammatic view showing an apparatus for manufacturing microcapsules.

FIG. 13 is a schematic view of a manufacturing apparatus for forming microcapsules described in the fourth embodiment. Light scatterers 31 and liquid crystal material 131 are mixed in a mixing chamber 121, and the mixture is allowed to pass through a porous glass 123 having pores with a diameter 800 to 1500 nm for adjusting the thickness of the liquid crystal material 131 covering in the range of from 200 to 350 nm. The covered light scatterers thus uniformly covered with liquid crystal material are mixed with a microcapsule forming material 133 in a microcapsule chamber 132, thus forming microcapsules in the same manner as the conventional liquid crystal microcapsule forming process. Specifically, the light scatterers covered with liquid crystal material are mixed with the microcapsule forming material made of gelatin/gum arabic mixed solution, are subjected to a complex core cellvation process, and are cooled, thus forming microcapsules 134. The microcapsules thus obtained are regularly and densely charged in a binder, to form the light modulating layer described in the fourth embodiment.

Figure 23:
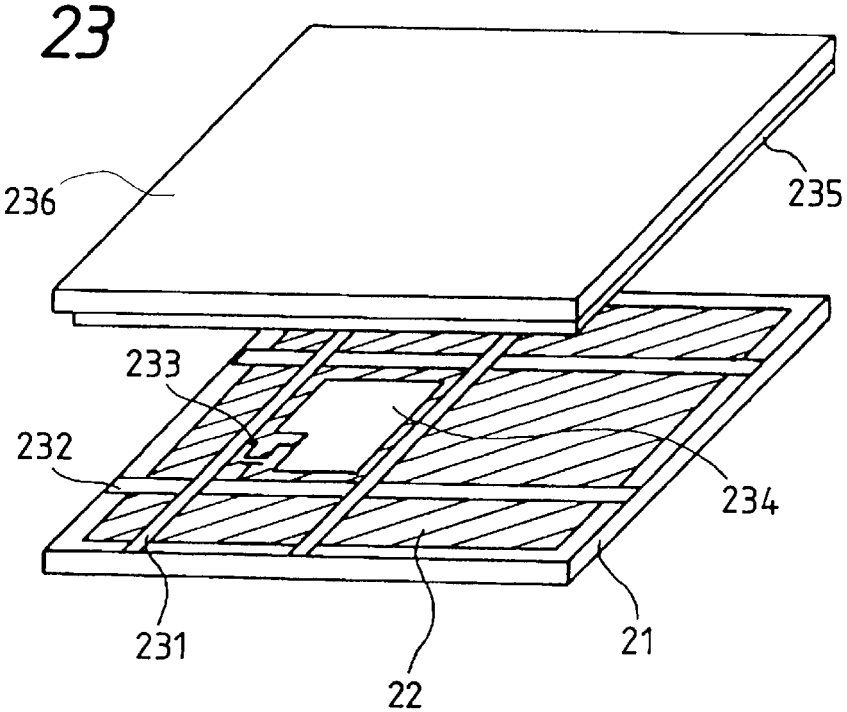
FIG. 23 is a diagrammatic view showing a reflective-type display device for an active-matrix drive system.

FIG. 23 is a schematic view of the reflective-type display device of the present invention, which is subjected to active matrix drive. In this figure, a light modulating layer is held between a substrate 21 including a light absorbing layer 22, signal electrode 231, scanning electrode 232, active switch 233 and pixel electrode 234, and a counter glass substrate including a counter electrode made of ITO. Such a structure is basically the same as that of a TFT liquid crystal display except that the substrate covered with the light absorbing layer made of carbon or the like is used and the light modulating layer described in each of the first to fifth embodiments is used in place of liquid crystal material held between orientation films. The active matrix drive of the reflective-type display device of the present invention makes it possible to stabilize the voltage applied to each light modulating layer without any cross talk, and hence to obtain an image with a higher quality as compared with the case of multiplex driving.

Figure 14:
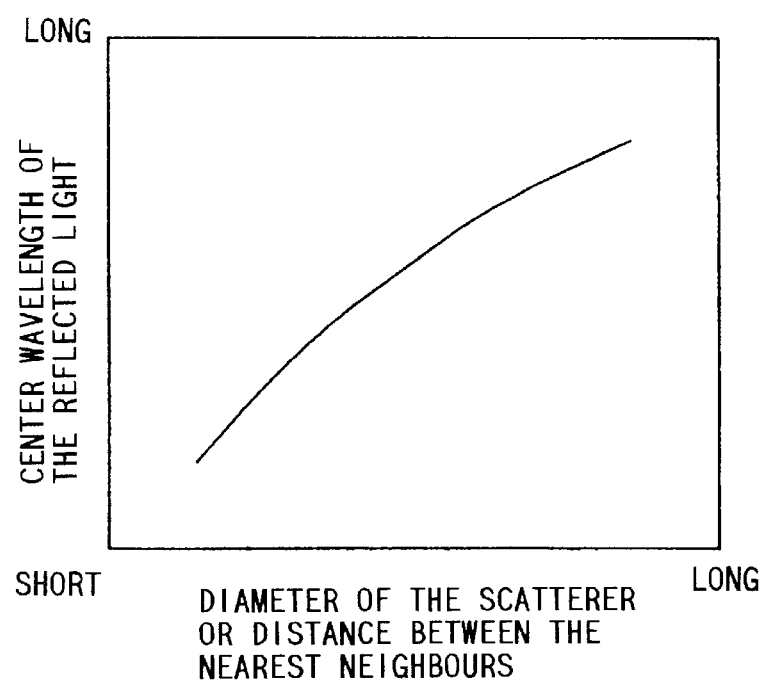
FIG. 14 is a graph showing the dependency of the diameter of a scatterer and the distance between the nearest neighbors on the center wavelength of reflected light.
Figure 15A:
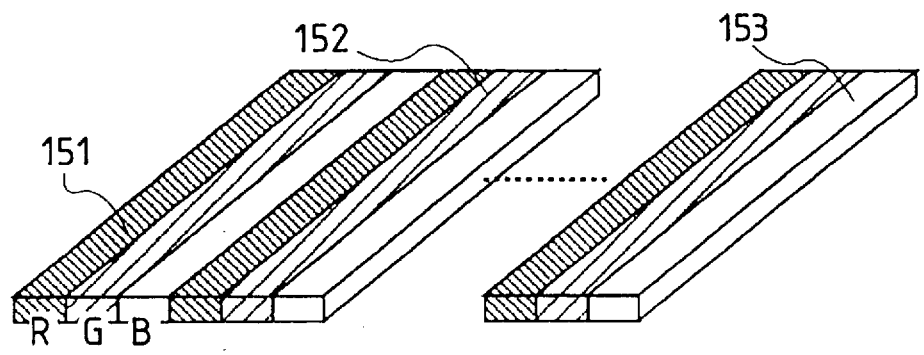
FIGS. 15a and 15b are a perspective view and a diagram showing a light modulating layer for color display and the reflected light spectrum, respectively.
Figure 15B:
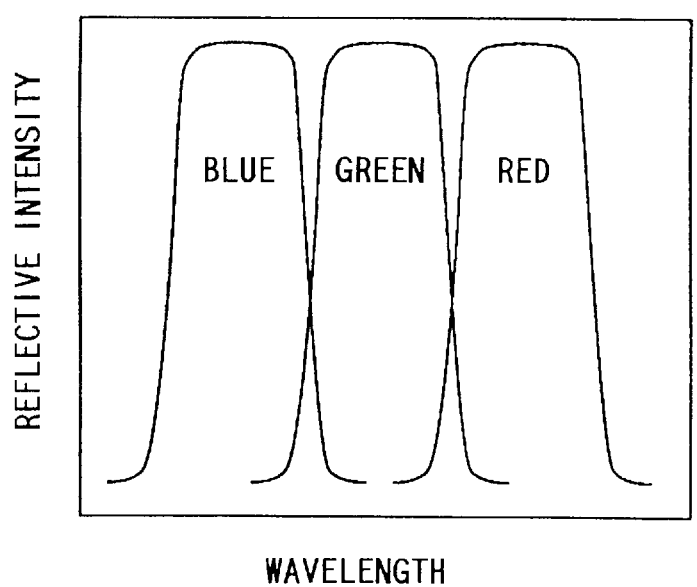

FIG. 15a shows one embodiment of a light modulating layer of a color reflective-type display device using the present invention, and FIG. 15b shows the reflective spectrum of the light modulating layer. As shown in FIG. 14, the wavelength of reflected (back scattered) light of the light modulating layer is nearly equal to the diameter of a light scatterer and to the interval between the light scatterers. Accordingly, by specifying the diameter of the light scatterer and the interval between the light scatterers, light having a specified wavelength can be selectively reflected. For example, when blue light is intended to be reflected, each of the diameter of a light scatterer and the interval between the light scatterers may be specified at about 450 nm; while when red light is intended to be reflected, it may be specified at about 650 nm. As shown in FIGS. 15a and 15b, a color reflective-type display device can be formed by arranging three light modulating layers capable of selectively reflecting three colors (blue, red and green) in a stripe shape and controlling the voltage applied to each layer.

Figure 19:
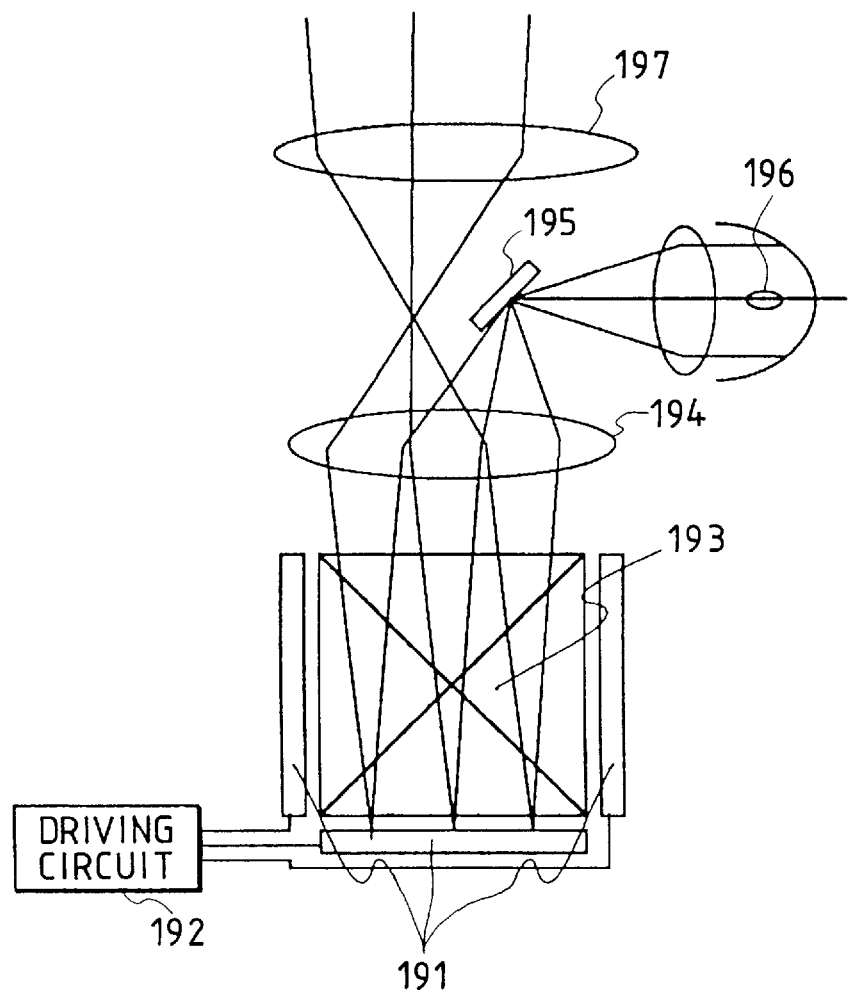
FIG. 19 is a diagrammatic view showing optics in a projection type display using the reflective-type display device of the present invention.

FIG. 19 is a schematic view showing the construction of a projection type display using the reflective-type display device of the present invention. White light outputted from a white light source 196 is divided into three primary colors RGB by means of a reflecting mirror 195, first collecting lens 194 and color dividing and mixing optics 193, and the divided three color light beams are respectively inputted in three parts to reflective-type displays 191. The reflective intensity of each reflected color light beam is adjusted using a drive voltage applied from a drive circuit 192 to the reflective-type display 191. After that, respective color light beams are mixed with each other by the color dividing/mixing optics, and the mixed color light is projected through the first collecting lens 194 and a second collecting lens 197. Conventionally, the PDLC liquid crystal has been used as a light modulating layer of the reflective-type display device; however, by adoption of the light modulating layer of the present invention, a projection type display with a high brightness and high efficiency can be realized.

Figure 20:
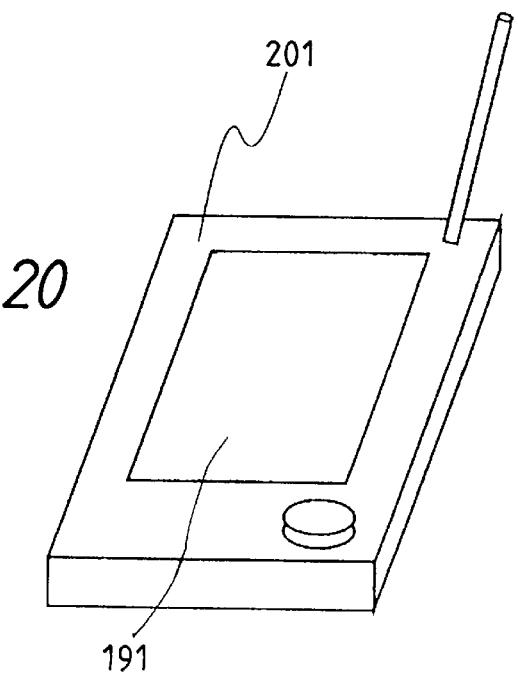
FIG. 20 is a perspective view showing a personal portable information terminal device using the reflective-type display device of the present invention.

FIG. 20 is a schematic view showing the construction of a personal portable information terminal apparatus using the reflective-type display device of the present invention As the display of a personal portable information terminal apparatus 201, a reflective-type display device which is low in power consumption and has a high quality is desirable. A reflective-type display device 191 of the present invention is deep in the bright state and has a memory effect, so that no continuous voltage is required to be applied to the information terminal for displaying still information, thus prolonging the battery life. Consequently, it becomes apparent that the display device of the present invention is suitable for use as a personal portable information terminal device.

Figure 21:
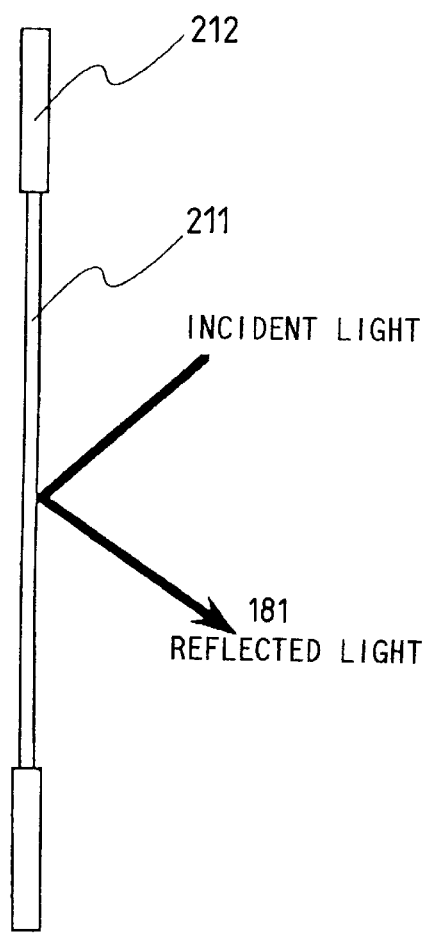
FIG. 21 is a diagrammatic view showing light modulating glass using the reflective-type display device of the present invention.

FIG. 21 is a schematic view showing the construction of a light modulating glass member using the reflective-type display device of the present invention. A light modulating glass panel 211 is effective to reduce the energy necessary for cooling/heating in an office of a building or the like by controlling the transmittance of natural light, that is, a light energy carried by natural light, and for this reason, such a device has been extensively researched in recent years. It becomes apparent that a light modulating glass panel having a high reflecting/transmitting effect with respect to natural light can be obtained using the light modulating layer which does not absorb light, as described in each of the first to fourth embodiments, and a transparent substrate provided with no light absorbing layer.

Figure 22:
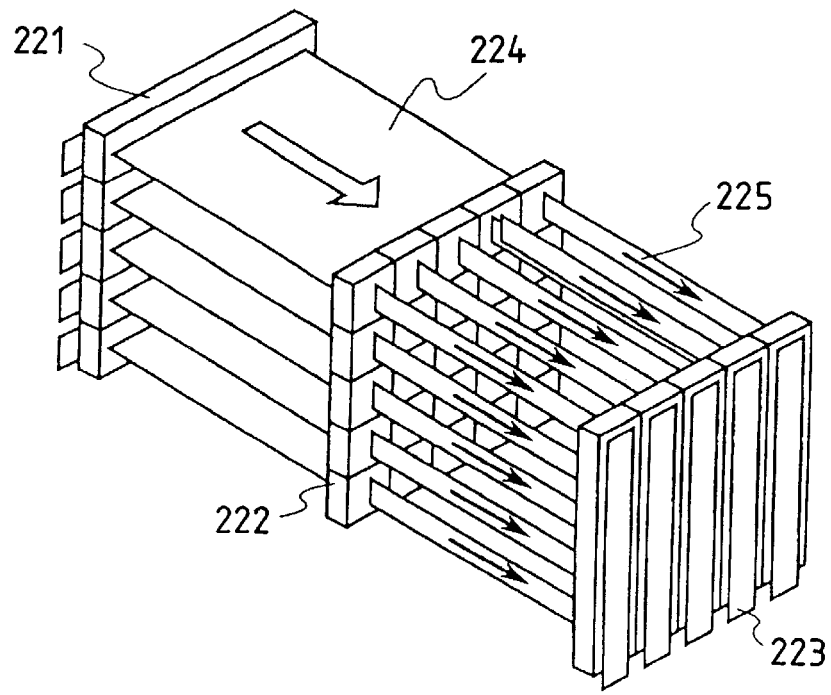
FIG. 22 is a perspective view showing an optical neural computer using the reflective-type display device of the present invention.

FIG. 22 is a schematic view showing the construction of an optical neural computer using the reflective-type display device of the present invention. The neural computer has been extensively researched as a future computer with a function near the thinking form of a human being having learning characteristics. An optical neural computer using a spacial light modulator 222 for controlling the transmittance and reflectance of light as an information processing/computing unit is desirable as a computer for processing vast amounts of information in parallel for a short period of time. The optical neural computer basically includes an emissive device array 221, spacial light modulator 222, and photo detector array 223. The intensity of output light 224 from the emissive drive array 221 is modulated by the spacial light modulator 222, and the modulated light 225 is received by the photo detector array 223 and the intensity of the modulated light is fed-back to the emissive drive array 221, thus executing a parallel calculation using light. It becomes possible to improve the calculating accuracy of the optical neural computer and hence to reduce the power consumption, using the reflective-type display device of the present invention, which is low in power consumption and high in efficiency, as the spacial light modulator 222.

Figure 24:
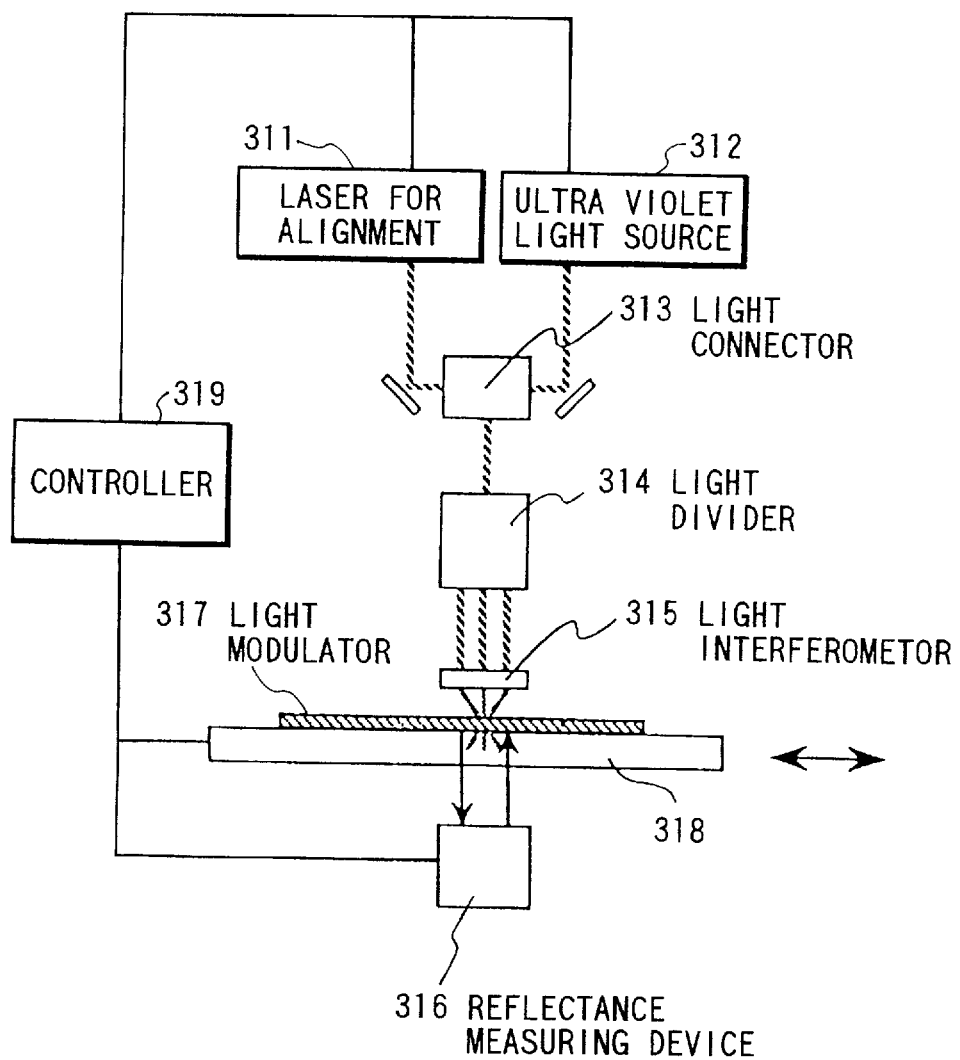
FIG. 24 is a schematic diagram showing the construction of an apparatus for manufacturing the reflective-type display device.

FIG. 24 is a typical view showing the construction of a manufacturing apparatus for manufacturing the light modulating layer of the present invention.

The manufacturing apparatus includes an argon laser light source 311 for regularly arranging the light scatterers; an ultra violet light source 312, such as a xenon lamp, for hardening an optical hardening type liquid host; a light connector 313, such as a rotating mirror; a light divider 314, such as a half mirror; a light interferometer 315 formed of a collecting lens or a plurality of mirrors with the angles adjusted; a reflectance measuring device 316 formed of a halogen lamp and a silicon light diode; moving stage 318; and a controller 319.

Figure 27:
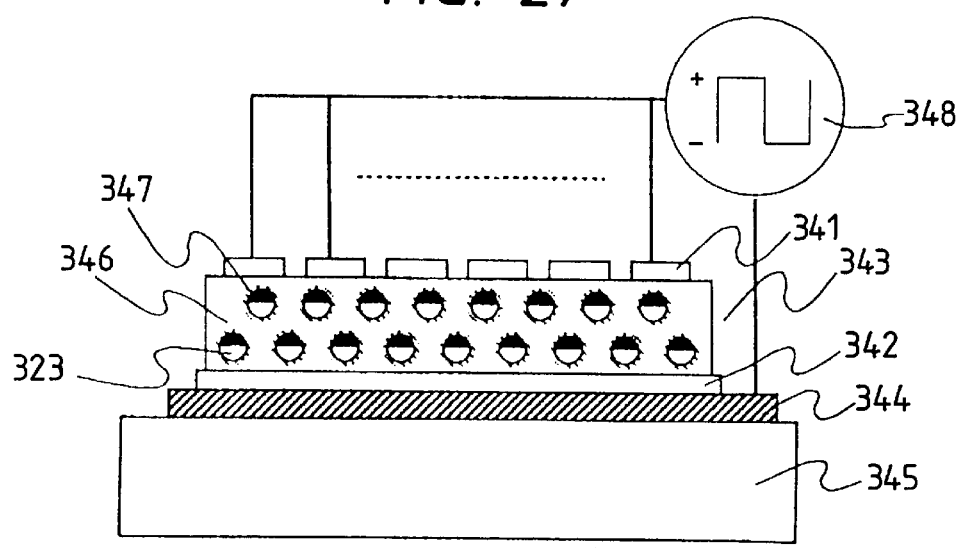
FIG. 27 is a sectional view showing an essential portion of the reflective-type display device.

First, as seen in FIG. 27, a reflective-type display device, prior to formation of a light modulating layer, is prepared by providing a light absorbing layer 344 formed of a carbon thin film, and a bottom transparent electrode 342 formed of a thin film of ITO (indium oxide added with tin in an amount of about 5%) on a substrate 345 made of a glass (7059 glass, produced by CORNING INC.). Next, as shown in FIG. 24, the reflective-type display device 317 is placed on the moving stage 318, and the bottom transparent electrode 342 is covered with a liquid host made of an ultra violet hardening type liquid organic material (for example, negative type photoresist such as OMR) mixed with spherical light scatterers (diameter: about 500 nm) made of $Ti_xSi_{1-x}O_2$ ($0 \leq x \leq 1$) coated with a lubricant, such as toluene, by a spin-coating process. An argon laser beam having a wavelength of from 400 to 700 nm emitted from the laser light source 311 passes through the light connector 313 and is divided into three beams by the light divider 314, which beams are collected at one point again by the light interferometer 315.

Figure 25A:
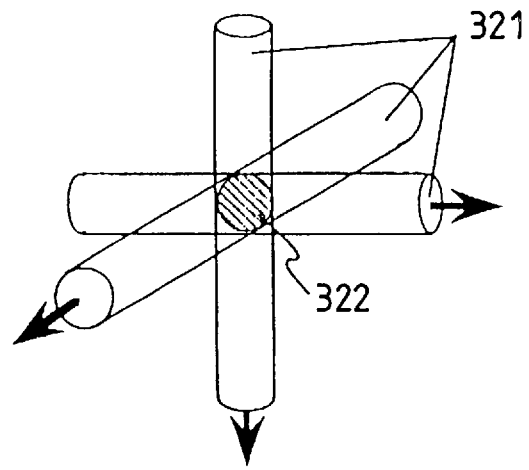
FIGS. 25a to 25c are diagrams showing the positional relationship between an interference light intensity and light scatterers in a light interference region.

FIG. 25a is a typical view showing the relationship between the light intensity distribution of the laser beam 321 collected at one point by the light interferometer 315 in a light interference region 322 and the positions of the light scatterers 323 in the host.

Figure 25B:
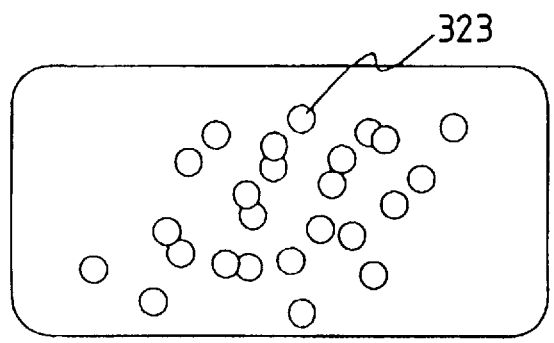
Figure 25C:
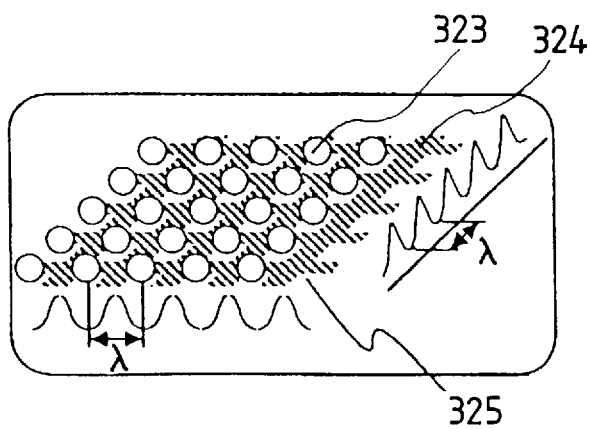

The laser beam intensity in the light interference region 322 is modulated at a cycle of from 400 to 700 nm by the three-dimensional light interference. As shown in FIG. 25b, the light scatterers 323 are dispersed in the host at random upon no irradiation of the laser beam; however, as shown in FIG. 25c, when the laser beam is irradiated, the light scatterers 323 are regularly arranged in such a manner as to be pushed out by the photon pressure effect from a portion 324 with a strong laser light intensity in the light intensity distribution formed in the light interference region to a portion 325 with a weak laser light intensity. In particular, the nearest distance between the adjacent light scatterers 223 is made to be nearly equal to the wavelength of irradiated light (400 to 700 nm) in accordance with the three-dimensional periodic light intensity distribution.

Figure 26:
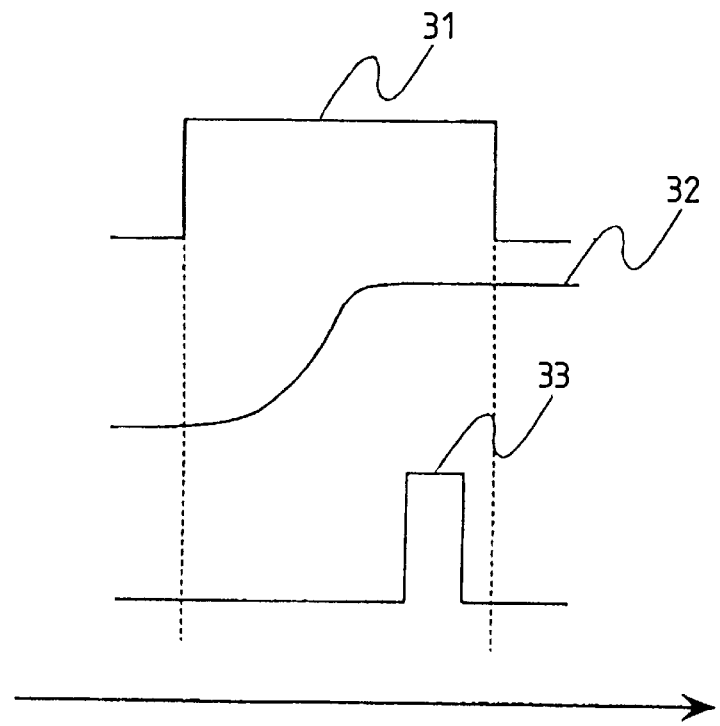
FIG. 26 is a graph showing changes with time in the intensity of an arranging laser beam, the intensity of reflected light in the light modulating layer and the intensity of a light hardening type UV ray.

FIG. 26 is a timing diagram showing the duration and waveform of the intensity 331 of the arranging laser beam, the intensity 332 of reflected light of the light modulating layer 343 received by the optical diode of the reflectance measuring device 316, and the intensity 333 of an ultra violet ray for light hardening of the host. In this figure, the reflected light received by the optical diode is halogen lamp light which is emitted from the reflectance measuring device 316 and is reflected by the light modulating layer 343.

When the light scatterers 323 in the host are regularly arranged by the arranging laser beam irradiated in the light modulating layer 343, the reflective intensity of the light modulating layer 343 is increased. After it is confirmed that the reflective intensity reaches the maximum value, an ultra violet ray is irradiated from the hardening UV light source 312 to only a portion of the host near the portion where the light scatterers 323 are regularly arranged using the same optics as that used for the arranging laser beam. The liquid host is hardened by the irradiation of the ultra violet ray, and the light scatterers are fixed and supported in the host in such a manner as to be three-dimensionally spaced at equal intervals.

By repeating the above process, while moving the position of the collecting spot (or the light modulating layer), there can be formed a light modulating layer 343 in which the light scatterers 323 are three-dimensionally spaced at equal intervals.

The above sequence can be automatically controlled by the controller 319, thus manufacturing a reflective-type display device at a high speed.

FIG. 27 is a typical sectional view of a reflective-type display device using the light modulating layer manufactured by the manufacturing apparatus of the present invention.

The reflective-type display device is so constructed that a light modulating layer 343, which is held between a plurality of transparent upper electrodes 341 and a plurality of bottom electrodes 342 made of ITO and facing each other in a matrix shape, is disposed on a substrate 345 covered with a light absorbing layer 344.

The light absorbing layer 344 is formed of a material capable of absorbing at least visible light (wavelength range: 400 to 700 nm) of incident light emitted to the reflective-type display device. The light modulating layer 343 includes a plurality of spherical light scatterers 323, a host 346 supporting the light scatterers 323, and a lubricant 347 formed between the light scatterers 323 and the host 346.

Each of the light scatterer 323 has a diameter nearly equivalent to the wavelength of visible light (400 to 700 nm) and is uniformly changed in its refractive index along a center axis, wherein the ratio between the maximum value and the minimum value of the refractive index is in the range of 1.5 or more. In FIG. 27, the light scatterer 323 are represented as spheres composed of a white semi-sphere and a black semi-sphere In this case, the black portion indicates a high refractive portion, and the white portion indicates a low refractive portion.

The vertex of the high refractive portion is composed of $Ti_xSi_{1-x}O_2$ ($x=1$), and the vertex of the low refractive portion is composed of $Ti_xSi_{1-x}O_2$ ($x=0$), where $0 \leq x \leq 1$. The coefficient x of $Ti_xSi_{1-x}O_2$ is changed from 1 to 0 in the range of from the vertex of the high refractive portion to the vertex of the low refractive portion, and accordingly, the refractive index is continuously changed from 2.7 to 1.5.

On the other hand, the refractive index of the host 346 is nearly equal to the minimum value 1.5 of the refractive index of the light scatterers 323. The frictional force between the light scatterers and host is small due to the effect of the lubricant 347 inserted between the light scatterers 323 and the host 346, and thereby the light scatterers 323 are easily rotated by a rotational torque applied to the light scatters 323.

The rotational torque is obtained by the inner product of a voltage applied across the upper and bottom electrodes 341 and 342 and a polarization generated in the light scatterers 323 having a refractive index distribution. The rotational direction of the light scatterers 323 is thus dependent on the polarity of the applied voltage 348.

In the reflective-type display device, the state where the high refractive portions of the light scatterers 323 are directed on the light incident side is defined as a bright state; and the reverse state is defined as a dark state. In the bright state, the visible light component of incident light is scattered/reflected by the light modulating layer 323, so that the display surface is viewed to be bright. In the dark state, the visible light component of the incident light passes through the light modulating layer 343 and is absorbed by the light absorbing layer 341, so that the display surface is viewed to be dark.

In the reflective-type display device, an image is displayed as follows. The numbers of the upper electrodes 341 and bottom electrodes 342 are taken as M and N, respectively. Next, a crossing portion between the m-th upper electrode ($1 \leq m \leq M$) and the n-th bottom electrode ($1 \leq n \leq N$) is taken as (m, n)-th pixel ($1 \leq m \leq M$, $1 \leq n \leq N$). The polarity and crest value of the applied voltage are controlled for each pixel of the line at first driving operation. Thus, an image composed of the bright and dark states of (M×N) pixels is displayed on the reflective-type display device.

Figure 28A:
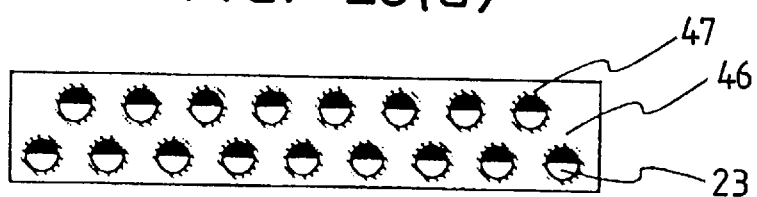
FIGS. 28a and 28b are diagrammatic views of inventive and prior art light modulating layers, respectively.
Figure 28B:
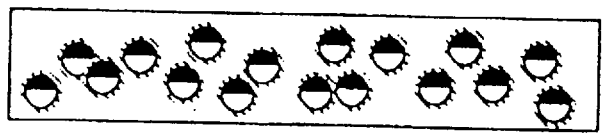

FIGS. 28a and 28b are typical views showing the arrangements of light scatterers in the inventive and the prior art light modulating layers, respectively.

In the prior art light modulating layer shown in FIG. 28b, the arrangement of light scatterers 323 is irregular, and thereby the nearest intervals between the light scatterers become uneven. On the contrary, in the inventive light modulating layer shown in FIG. 28a, the light scatterers are three-dimensionally regularly arranged, and thereby each interval between the light scatterers 323 substantially is equal to the wavelength (400–700 nm) of visible light.

In addition, although the previous embodiments have been described as using the reflective-type display device, the reflective-type display device becomes a transmission type display device if the light absorbing layer 344 is not provided, and the displaying principle thereof is the same as that of the reflective-type display device.

As described above, according to the present invention, there can be realized a reflective-type display device having a high brightness/high contrast, which is capable of obtaining a bright state which is deeper than that in the conventional one while providing a sufficiently high dark state. The reflective-type display device having such a high performance can be expected to be extensively applicable for use as a portable information terminal device, a projection type display device, a light modulating glass pane, and an optical computer.

What is claimed is:

1. A reflective-type display device comprising:
   a light modulating layer including a host within which light scatterers are dispersed, said light modulating layer being held between two transparent electrodes;
   a light absorbing layer disposed on one side of said light modulating layer in which at least one of the size of said scatterers and the nearest distance between adjacent light scatterers is substantially equivalent to the wavelength of incident light; and
   a refractive index ratio relative to incident light between said light scatterers and said host varies from 1 to 1.8 in response to a change in the magnitude of a voltage applied across said electrodes.

2. A reflective-type display device according to claim 1, wherein the refractive indexes and absorption coefficients of said light scatterers and said host relative to incident light simultaneously vary in response to a change in the magnitude of said voltage applied across said electrodes.

3. A reflective-type display device according to claim 1, wherein the operating state of said light modulating layer is shifted in response to a change in the magnitude of said voltage applied across said electrodes between a state where the reflectance of light is low and the absorption coefficient and transmittance of light are low, and a state where the reflectance of light is low and the absorption coefficient and the transmittance of light are high.

4. A reflective-type display device according to claim 3, wherein the minimum value of the refractive index of said light scatterers is nearly equal to the maximum value of the refractive value of said host,
   the refractive index of said light scatterers is increased and the refractive index of said host is decreased when a certain first voltage is applied across said electrodes and thereby the refractive index ratio between said light scatterers and said host is increased and the absorption coefficients of said light scatterers and said host are decreased, so that the operating state of said light modulating layer becomes a state in which the reflectance is high and th e absorption coefficient is low; and
   the refractive index of said light scatterers is decreased and the refractive index of said host is increased when a different second voltage is applied across said electrodes, and thereby th e refractive index of said light scatterers corresponds to that of said host and the absorption coefficients of said light scatterers and said host are increased, so that the operation state of said light modulating layer becomes a state in which the reflectance is low and the absorption coefficient and transmittance are high.

5. A reflective-type display device according to claim 1, wherein dielectric fine particles are used as said light scatterers, said dielectric fine particles having a refractive index which is linearly decreased and an absorption coefficient which is increased in a direction passing through the axial center of said fine particle; the diameter of said dielectric fine particles being equal to the peak wavelength of reflected light, and a surface of said dielectric fine particles having a high refractive index and low absorption coefficient being directed either to the incident light side or to the side opposite the incident light side depending on the direction of said applied voltage.

6. A reflective-type display device according to claim 5, wherein said dielectric fine particles are covered with a material having a refractive index equal to the minimum value of the refractive index of said fine particles to a thickness equivalent to a half of the wavelength of reflected light, and said covered light scatterers are densely laminated to each other through a lubricant having a refractive index equal to that of said material.

7. A reflective-type display device according to claim 6, wherein said covering material comprises one of ZnS, $SiO_2$ and a mixed material thereof.

8. A method of manufacturing said light scatterers described in claim 6, comprising the steps of:
  covering dielectric fine particles with a covering material liquid to a specific thickness; and
  heating and solidifying said covering material liquid while said dielectric fine particles covered with said covering material liquid are being freely dropped.

9. An apparatus for manufacturing said light scatterers described in claim 6, comprising:
  means for covering dielectric fine particles with a covering material liquid to a specific thickness; and
  means for heating and solidifying said covering material liquid while said dielectric fine particles covered with said covering material liquid are being freely dropped.

10. A reflective-type display device according to claim 1, wherein said light scatterers in said light modulating layer are covered with a host material to a thickness equivalent to a half of the peak wavelength of reflected light, or said covered light scatterers are microencapulated with a covering material to a negligible thickness as compared with the thickness of said host material, and said covered light scatterers or said microcapsules are densely laminated to each other through a lubricant having a refractive index near that of said host material.

11. A reflective-type display device according to any of claims 5, 10 and 6, wherein each of said light scatterers comprises a dielectric fine particle including TiO2 and SiO2, and in which the component ratio of $TiO_2$ and $SiO_2$ is linearly changed from 1 to 0 in a direction passing through the center axis of said fine particle, and wherein a surface of said dielectric fine particle made of $SiO_2$ is covered with a light absorbing material, such as $PrMnO_3$, $As_2S_3$, $As_2Se_3$, Ge, a-$Si_xC_{1-x}$:H, $Sb_2S_3$, CdTe, CdSe or PbCdTe:In.

12. A reflective-type display device according to claim 11, wherein said dielectric fine particles are manufactured by an ion shower process.

13. A reflective-type display device according to claim 1, wherein said host comprises a guest-host liquid crystal containing a light absorbing pigment.

14. A reflective-type display device according to claim 1, wherein said host comprises an acicular metal powder such as chromium powder, hematite acicular crystal, and quinine or hydrocinchonidine containing iodine crystal.

15. A reflective-type display device according to claim 1, wherein the wavelength range of reflected light is controlled by suitably adjusting at least one of the size of each of said light scatterers and the nearest interval between said light scatterers.

16. A reflective-type display device according to claim 1, wherein said two transparent electrodes comprise a plurality of scanning electrodes opposed to a plurality of signal electrodes, said light modulating layer being held between said plurality of said scanning electrodes and said plurality of said signal electrodes; and further comprising a scanning circuit for sequentially driving a plurality of said scanning electrodes connected to said scanning electrodes; and a signal circuit for displaying an image connected to a plurality of said signal electrodes.

17. A reflective-type display device according to claim 1, wherein said reflective-type display device is subjected to active matrix drive using a field effect transistor, diode or MIM.

18. A color display device using said reflective-type display device described in claim 1, wherein a plurality of light modulating layers for respective colors of scattered light are disposed in a stripe shape, and including means for controlling the intensity of scattered light in each of said light modulating layers, thus performing color display.

19. A personal portable information terminal device using a reflective-type display device, said reflective-type display device comprising:
  a light modulating layer including a host within which light scatterers are dispersed, said light modulating layer being held between two transparent electrodes;
  a light absorbing layer disposed on one side of said light modulating layer in which at least one of the size of said scatterers and the nearest distance between said adjacent light scatterers is substantially equivalent to the wavelength of incident light; and
  a refractive index ratio relative to incident light between said light scatterers and said host varies from 1 to 1.8 in response to a change in the magnitude of a voltage applied across said electrodes.

20. A projection type display using a reflective-type display device, said reflective-type display device comprising:
  a light modulating layer including a host within which light scatterers are dispersed, said light modulating layer being held between two transparent electrodes;
  a light absorbing layer disposed on one side of said light modulating layer in which at least one of the size of said scatterers and the nearest distance between said adjacent light scatterers is substantially equivalent to the wavelength of incident light; and
  a refractive index ratio relative to incident light between said light scatterers and said host varies from 1 to 1.8 in response to a change in the magnitude of a voltage applied across said electrodes.

21. An optical computer using a reflective-type display device, said reflective-type display device comprising:
  a light modulating layer including a host within which light scatterers are dispersed, said light modulating being held between two transparent electrodes;
  a light absorbing layer disposed on one side of said light modulating layer in which at least one of a size of said scatterers and the nearest distance between said adjacent light scatterers is substantially equivalent to the wavelength of incident light; and
  a refractive index ratio relative to incident light between said light scatterers and said host varies from 1 to 1.8 in response to a change in the magnitude of a voltage applied across said electrodes.

22. A light modulating glass using a reflective-type display device, said reflective-type display device comprising:
  a light modulating layer including a host within which light scatterers are dispersed, said light modulating layer being held between two transparent electrodes;
  a light absorbing layer disposed on one side of said light modulating layer in which at least one of the size of said scatterers and the nearest distance between said adjacent light scatterers is substantially equivalent to the wavelength of incident light; and
  a refractive index ratio relative to incident light between said light scatterers and said host varies from 1 to 1.8 in response to a change in the magnitude of a voltage applied across said electrodes.

* * * * *